Patented May 10, 1927.

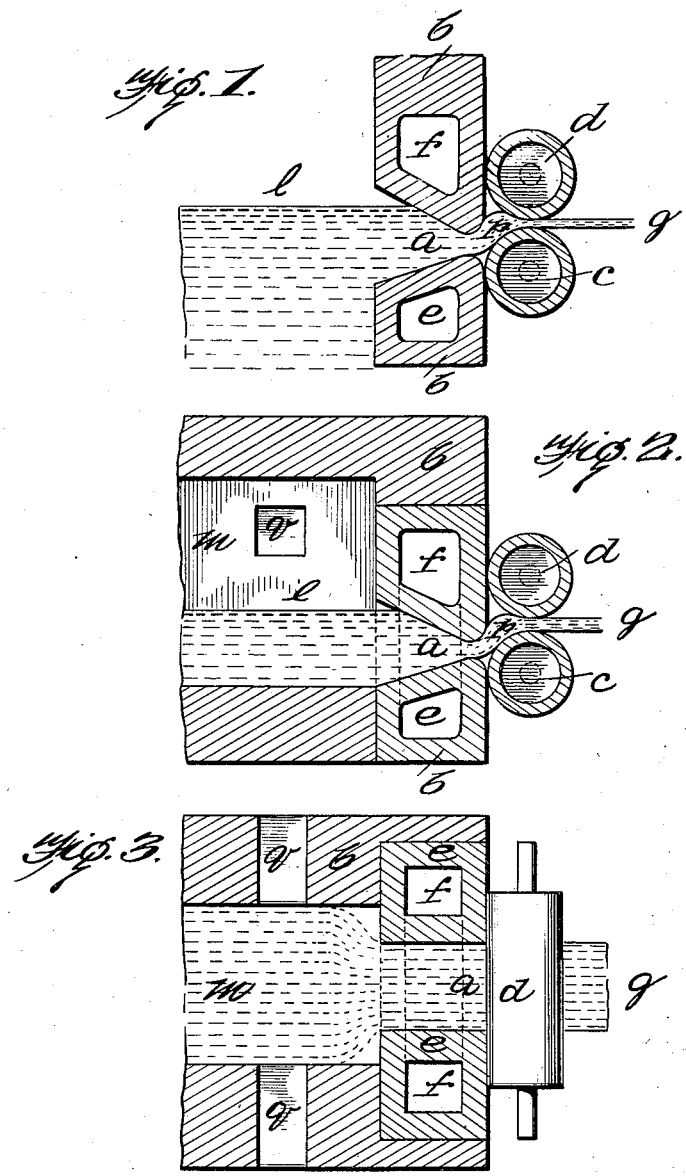

1,628,353

UNITED STATES PATENT OFFICE.

LOUIS BOUDIN, OF ST. GOBAIN, FRANCE, ASSIGNOR TO SOCIÉTÉ ANONYME DES MANUFACTURES DES GLACES & PRODUITS CHIMIQUES DE SAINT-GOBAIN, CHAUNY & CIREY, OF PARIS, FRANCE.

PROCESS AND APPARATUS FOR MAKING SHEET GLASS.

Application filed April 27, 1926, Serial No. 105,039, and in France October 9, 1924.

This application is filed as a continuation in part of a prior application Serial No. 60,598, filed by me October 5, 1925 for the purpose of describing the process embodied in the apparatus disclosed in the said application more fully than is set forth therein, and also for the purpose of describing and claiming certain new and additional features.

It has been proposed by others to issue glass horizontally from a tank furnace through an issue opening and through a "pass" between forming rolls, which pass, in effect, forms the lips of the opening to the end that, among other things, the flow or non-flow of glass through the opening, as well as the rate of flow through the opening, may be controlled by the surface speed of the rolls. This requires that the outer walls or lips of the issue opening conform closely to the rear surface of the rolls to prevent glass entering between them, where it may interfere with the action of the rolls.

As is well known, the flow of glass through such restricted channels tends to set up therein longitudinal stratification due to the elongation of individual masses of the glass. This stratification is objectionable for many reasons, and attempts have been made to overcome this, by re-conditioning the glass in forehearths. In that case, regulation to meet varying furnace conditions is effected by a gate valve, which sets up disturbances in the glass flow, with resultant defects in the glass. To remove these defects it has been proposed to interpose a conditioning chamber between the tank and the forming pass, the chamber being called on not only to remove the effects produced by the flow of the glass from the tank, but those due to the constriction of the flow passage at the gate way.

I propose to use a construction dispensing with the close fit above mentioned between the rolls and lips of the issue opening, and to prevent, in the operation of the apparatus, the entry of glass into the spaces left between them, by moving the glass upwardly by one or both of the rolls. Furthermore, I propose to utilize the lower roll as the means of creating the greater portion of the drag and this in a direction tending to neutralize the sagging of the glass, so that the upper surface of the sheet may be but slightly modified in temperature and texture by the upper roll, the surface being thus maintained in the proper condition for the impression of designs thereon, if desired, by mechanism acting on the sheet formed at the pass after such formation. In this application I have shown, as a means of accomplishing the purposes stated, a pair of forming rolls, the pass between which is parallel to the horizontal plane passing through the center of the issue opening, with the top surface of the lower roll (forming the bottom of the pass) preferably above the level of the top of the issue opening.

Another object of my invention is to provide a method of working, and an apparatus suitable for use in carrying out the same, in which, while the glass is fed from the tank to the forming "pass" through a passage way of uniform area, flow regulation to meet furnace conditions is automatically effected by the surface level of glass in an equalizing pool or chamber which is lower than that in the tank.

For purposes stated, my invention consists in the processes and in the apparatus hereinafter more particularly described and claimed.

Referring to the corresponding drawings, in which corresponding parts are designated by corresponding marks of reference,—

Figure 1 is a diagrammatic section through an apparatus embodying my invention and adapted to carry the same into effect.

Figure 2 is a longitudinal section through an apparatus embodying this invention, showing the issue opening in the end of a furnace spout.

Figure 3 is a horizontal section through the construction shown in Figure 2.

Figure 4:
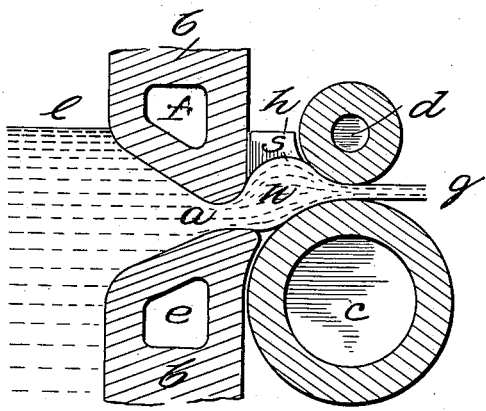
Figures 4, 5 and 6 are diagrammatic vertical sections through other embodiments of my invention.

In Figure 1, $b$ is a wall of a glass container, in which the level of glass is represented by $l$. A suitable issue opening $a$, is formed in this wall somewhat below the level of the glass line within the furnace and forehearth, the opening widening inwardly from a restricted throat at the outer side of the wall. Heating chambers $e$ and $f$ may, as shown, be located within the wall $b$ adjacent to the opening for the purpose of maintaining proper temperatures at such points. Immediately on the outside of the wall $b$ are located a pair of forming rolls of any approved construction $d$ and $c$ driven in any suitable manner. The periphery of these rolls is separated by a space equal to the desired thickness of the sheet $g$ to be formed, the pass between them being above the issue opening, and, by preference, entirely above the lower surface of the upper lip of the opening. The rolls are near the wall $b$, and hence form a more or less closed chamber immediately at the outer end of the opening. By preference, as shown, the slope of the lower inner wall of the issue opening is substantially at a tangent to an upper surface on the roll $c$, so that no abrupt curves are formed.

Figures 2 and 3 illustrate a somewhat fuller embodiment of my invention, in which the opening $a$ is formed in the end wall of a glass furnace spout $m$. Suitable heating ports $q$ may be provided by which the temperature in the spout may be regulated.

In the movements of the glass through the chamber formed by the wall $b$ and the rolls $c$ and $d$, chilling of the glass is prevented, by the fact that such chamber is, as has been described, more or less closed, so that the glass therein is not subject to currents of cold air.

By preference, the issue opening is in the form of a horizontally elongated opening, this being for the purpose of properly spreading the issued glass on the roll.

In the operation of the apparatus shown the molten glass flows through and issues from the front end of the issue opening under the pressure of the head of glass in the tank or spout. After issue from the opening the glass contacts with the upper rear quadrant of the lower roll $c$, by which it is conveyed to the pass between the rolls. While the glass immediately at the outer side of the opening is under compression, due to the glass head (as is shown at $p$ by the swelling of the upper surfaces of the issued glass), this compression is destroyed beyond that point by the pull of the lower roll $c$, which moves the issued glass diagonally upward and away from the lower lip of the opening, clear of the space between the lip and the lower roll, to the pass between the rolls, through which it passes, making contact merely with the lower surface of the upper roll $d$. By reason of this slight contact the upper surface of the sheet $g$ is but slightly chilled in the forming operation, so that its temperature is sufficiently high to receive the impression of designs which may be placed thereon by an embossing roll located further along in the line of movement of the sheet or, if desired, the roll $d$ may be preferably figured to produce the designs.

The process above described should be distinguished, on the one hand, from those drawing processes which involve the issue of glass in sheet from a forming opening under head pressure and the pull of rolls acting on the formed sheet and, on the other hand, from processes involving passing the glass through both an issue opening and forming pass under the head pressure in the tank. In the process above described the meniscus or swelling formed at the outer end of the issue opening has a tendency to regulate the rate of issue, as the formation of the meniscus tends to absorb some of the head pressure due to the glass in the tank. If this head pressure decreases, the meniscus or swelling at $p$ decreases, whereby the pressure counter to the head pressure decreases with a resultant increase of the rate of flow through the issue opening. In the same way if the speed of the rolls increase the meniscus is reduced with an increase of flow through the issue opening.

Figure 6:
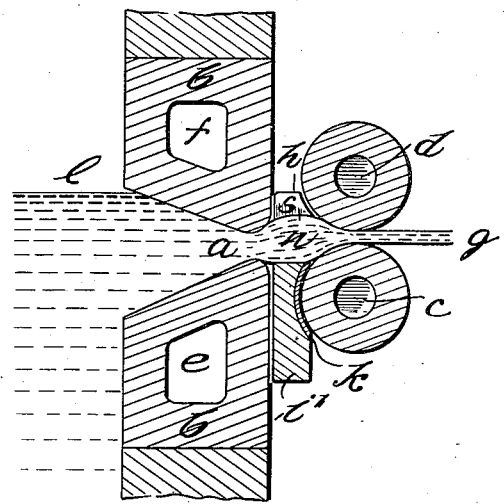
Figure 5:
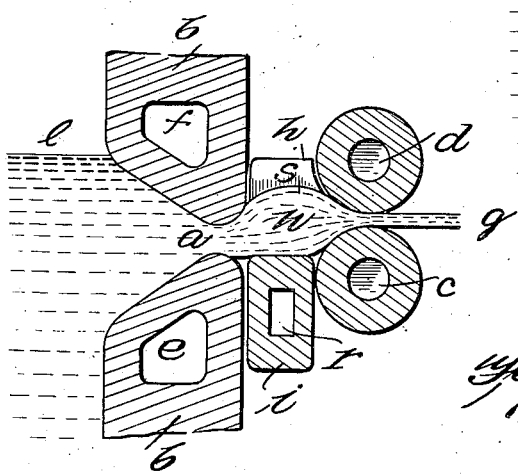

In Figures 4, 5 and 6 I have illustrated a form of my invention in which the rolls are located at a somewhat greater distance from the outer end of the slot than in the previous figures. This permits observation of the glass between the slot and the forming pass and access thereto. It also increases the amount of glass in the pool formed between the slot and the pass. This distance of the pass from the slot should not be made so great that the meniscus on the surface of the glass in the pool is lost.

In Figures 4 and 5 $b$ is a vertical wall of a continuous glass melting furnace of any approved design and capacity, or of a spout connected therewith in which the level of glass (represented by $l$) is kept at more or less constant height as by the addition of glass batch to replace molten glass which may issue therefrom through the submerged issue slot $a$, in the vertical wall $b$. The surface of the slot $a$ may be heated by the flues $e$ and $f$, or equivalent means.

The outer end of the slot opens into a pool chamber $n$, the outer wall of which comprises a roller $d$, superimposed upon a roller $c$, a forming pass being between these rolls, the temperatures of which may be controlled in any known and approved manner. As shown, the "pass" between the rolls is above the lower wall of the slot $a$, as before disclosed so that the upper portion of the lower roll $c$ also forms a part of the front wall of the chamber $n$.

In Figure 4 the bottom of the chamber is shown as formed by the upper rear surface of the lower roll $c$, which is made of greater diameter than the roll $d$, the lower wall of the slot $a$ turning in a lip to conform more or less to the surface of the roll $c$.

In Figure 5, in which the rolls are substantially of the same diameter, the bottom of the chamber is formed by a block $i$, which may be suitably heated by the flue r, or otherwise.

In Figure 6, which illustrates to approximate scale a form of my invention which I have used in the production of many thousand of feet of hammered sheet glass, the bottom of the pool chamber is formed by a removable block i' having a recessed face to receive the lower roll c, a sheet of asbestos k being interposed between the two.

The glass within the chamber n is confined laterally by wing wall blocks h. These blocks are suitably shaped on their forward faces to conform to the surface of the rolls.

In the operation of the apparatus above described, the glass issues from the tank or spout through the slot a and into the pool chamber n, under the head pressure of the glass level l in the tank. By properly selecting values for the several controlling factors (i. e., head on the interior end of the slot; vertical width of the issue slot; viscosity of the glass and its temperature; the distance between the front and rear walls of the chamber; the surface speed of the forming rolls; and the width of the pass between them), somewhat stable conditions will be obtained in which the glass in the chamber will have a convex meniscus s at its upper surface, which will be below the level of glass in the tank.

In continuous operation for any considerable period of time, the amount of glass passing through the issue slot will of course be the same as that passing through the "pass", and this will be found to be true to a certain extent at every instant, as the pool chamber, constructed as has been described, acts to regulate the flow through the issue slot in accordance with the amount passing the rolls, and this in spite of ordinary variations in furnace conditions. This regulating action may be due to the elasticity of the meniscus s at the surface of the glass in the chamber n, the meniscus itself being maintained in part by the downward travel of the rear surface of the upper roll d.

From the above it will be seen that my invention also contemplates a chamber n which, while of sufficient capacity to form an equalizing pool of glass after the same has passed through the issue slot a (although the latter is of relatively large area to reduce the disturbances resulting from flow therethrough), has a fore and aft dimension sufficiently small to permit the upper roll d to maintain the meniscus s at the surface of the glass. For this purpose also the depth of glass in the chamber should be such that the roll d may maintain a downward drag on the glass at the front end of the chamber.

The fore and aft dimension of the pool chamber may obviously be varied by moving the upper roll d to and from the vertical wall b, and this may be done to compensate for variations in the glass level l or to vary the rate of flow through the issue slot.

Having thus described my invention what I claim is:—

1. The hereinbefore described process of feeding molten glass through a submerged issue opening of a glass container to a forming pass which comprises causing the glass to issue in a substantially horizontal direction in a highly heated condition through the issue opening under the head pressure of glass above the opening, and moving the glass issued from the opening to the forming pass at a rate which permits the creation under the head pressure of a meniscus on the glass outside of the opening.

2. The hereinbefore described process of feeding molten glass through a submerged issue opening of a glass container to a forming pass which comprises causing the glass to issue in a substantially horizontal direction in a highly heated condition through the issue opening under the head pressure of glass above the opening, moving the glass issued from the opening to the forming pass at a rate which permits the creation under the head pressure of a meniscus on the glass outside of the opening, and regulating the rate of flow through the opening by the counter pressure due to the meniscus.

3. The hereinbefore described process of feeding molten glass through a submerged issue opening of a glass container to a forming pass which comprises causing the glass to issue in a substantially horizontal direction in a highly heated condition through the issue opening under the head pressure of glass above the opening, moving the glass issued from the opening to the forming pass at a rate which permits the creation, due to the head pressure of a meniscus surface upon the glass outside of the opening, feeding the glass below the meniscus to the forming pass, and regulating the rate of flow through the opening by the counter pressure due to the meniscus.

4. The hereinbefore described process of feeding molten glass through a submerged issue opening of a glass container to a forming pass, which comprises causing the glass to issue in a substantially horizontal direction in a highly heated condition through the issue opening under the head pressure of glass above the opening, moving the glass issued from the opening to the forming pass at a rate which permits the creation, due to the head pressure, of a meniscus on the glass outside of the opening, and moving the issued glass upwardly in an inclined path to the forming pass at a rate sufficiently to prevent issued glass from flowing down along the front wall of the opening.

5. The hereinbefore described process of feeding molten glass through a submerged issue opening of a glass container to a forming pass, which comprises causing the glass to issue in a substantially horizontal direction in a highly heated condition through the issue opening under the head pressure of glass above the opening, moving the glass issued from the opening to the forming pass at a rate which permits the creation due to the head pressure of a meniscus on the glass outside of the opening, receiving the issued glass on a travelling member which at the point it receives the glass is moving upwardly, and delivering the glass by the movement of the said member to the forming pass.

6. The hereinbefore described process of forming sheet glass which comprises feeding molten glass in a substantially horizontal direction through an issue opening under head pressure above the opening, moving the issued glass upwardly from the issue lips of the opening to a forming pass, and forming the issued glass into sheet form at such pass.

7. The combination with a container for molten glass, having a submerged issue opening in a vertical wall thereof, of a travelling member to receive and move the issued glass, and which at the point it receives the glass is moving upwardly, and means, constituting a forming pass, to which the glass is delivered by the travelling member.

8. The combination with a container for molten glass, having a submerged issue opening in a vertical wall thereof, of means to receive and move the issued glass, and which at the point it receives the glass is moving upwardly, of a pair of members having coacting travelling surfaces forming between them a sheet forming pass located above the horizontal plane of the issue opening.

9. The combination in an apparatus for the fabrication of sheet glass, of a container having a submerged issue opening in a vertical wall thereof, a pair of rolls located adjacent to the slot and forming with the wall an enclosed chamber, the rolls being spaced apart to constitute a sheet forming pass at a point above the level of the opening.

10. The combination in an apparatus for the manufacture of sheet glass, of a container for molten glass having a submerged elongated issue opening in a vertical wall thereof, a pair of driving rolls spaced apart to constitute a sheet forming pass at a point above the opening but located adjacent thereto, one of the said rolls receiving glass from the opening.

11. The hereinbefore described method of feeding glass from a furnace to a forming pass, which comprises in creating by a downwardly travelling surface adjacent to the pass a meniscus on the surface of the glass and regulating the flow of glass from the furnace to the pass by the modifying effect of such meniscus on the glass flow produced by the head of glass in the furnace.

12. The hereinbefore described method, which comprises passing the glass from the furnace to a pool under the head pressure of the glass in the furnace, creating by the action of a travelling surface a meniscus on the surface of the glass in the pool, and thereby regulating the rate of flow to the pool, and passing the glass from the pool through a forming pass.

13. The hereinbefore described method, which comprises passing glass from a furnace to a pool under the head pressure of the glass in the furnace, and from the pool through a forming pass between travelling surfaces, and controlling the flow from the furnace to the pool by creating a meniscus on the surface of the glass in the pool by a downwardly travelling surface moving in unison with a surface of the pass.

14. The hereinbefore described method, which comprises passing glass from a furnace to a pool under the head pressure of the glass in the furnace and from the pool through a forming pass between rolls, and controlling the flow from the furnace to the pool by a meniscus created by the downward movement of a portion of one surface of one of the rolls.

15. In an apparatus for forming molten glass into sheet, the combination of a furnace, a pool communicating with the furnace through a passage, both ends of which are submerged in glass, of a forming roll at the forward end of the pool, the rear side of the roll being within the pool and in contact with the glass therein, and a member coacting with the forming roll to form a horizontal pass.

16. In an apparatus for feeding molten glass, the combination with a furnace having a submerged flow opening therein of relatively large area, a pool located and submerging at the outer end of such flow opening, and rolls acting on the glass drawn from the pool the surface of one of such rolls moving downwardly in contact with the glass in the pool to create a meniscus surface thereon.

In testimony whereof I hereunto affix my signature.

LOUIS BOUDIN.